Jan. 10, 1950     E. L. WEAVER     2,494,073
KNURLING TOOL HOLDER
Filed Aug. 16, 1946     2 Sheets-Sheet 1
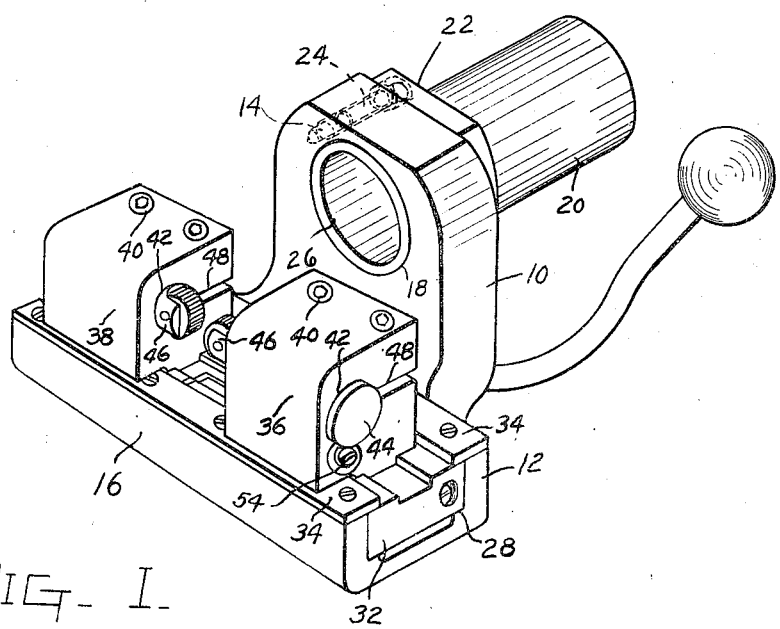
FIG. I.
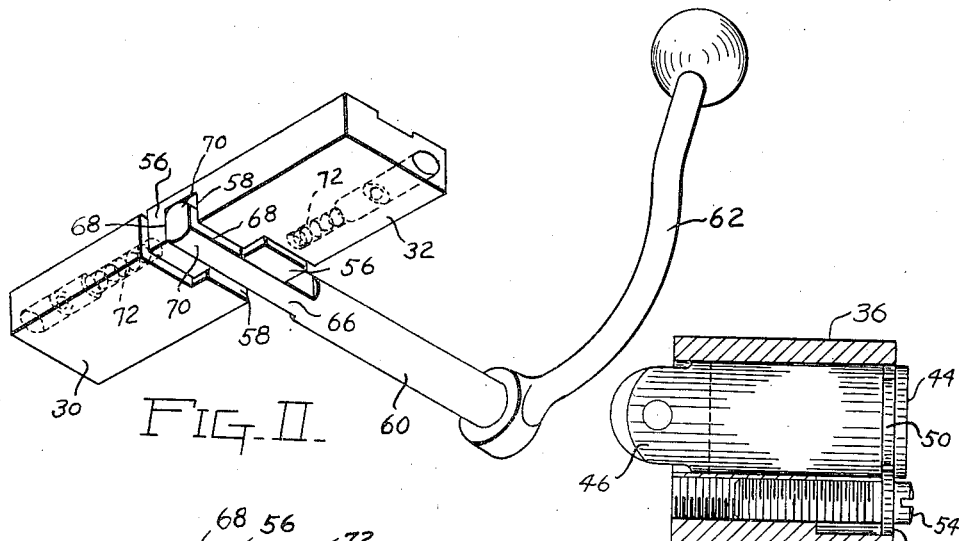
FIG. II.
FIG. IV.
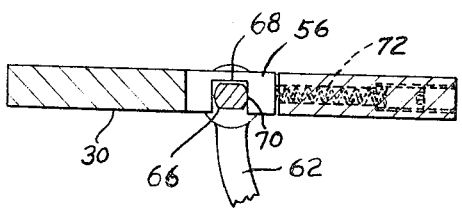
FIG. III.
Inventor
ERNEST L. WEAVER
By Beaman & Langford
Attorneys Jan. 10, 1950  E. L. WEAVER  2,494,073
KNURLING TOOL HOLDER
Filed Aug. 16, 1946  2 Sheets-Sheet 2
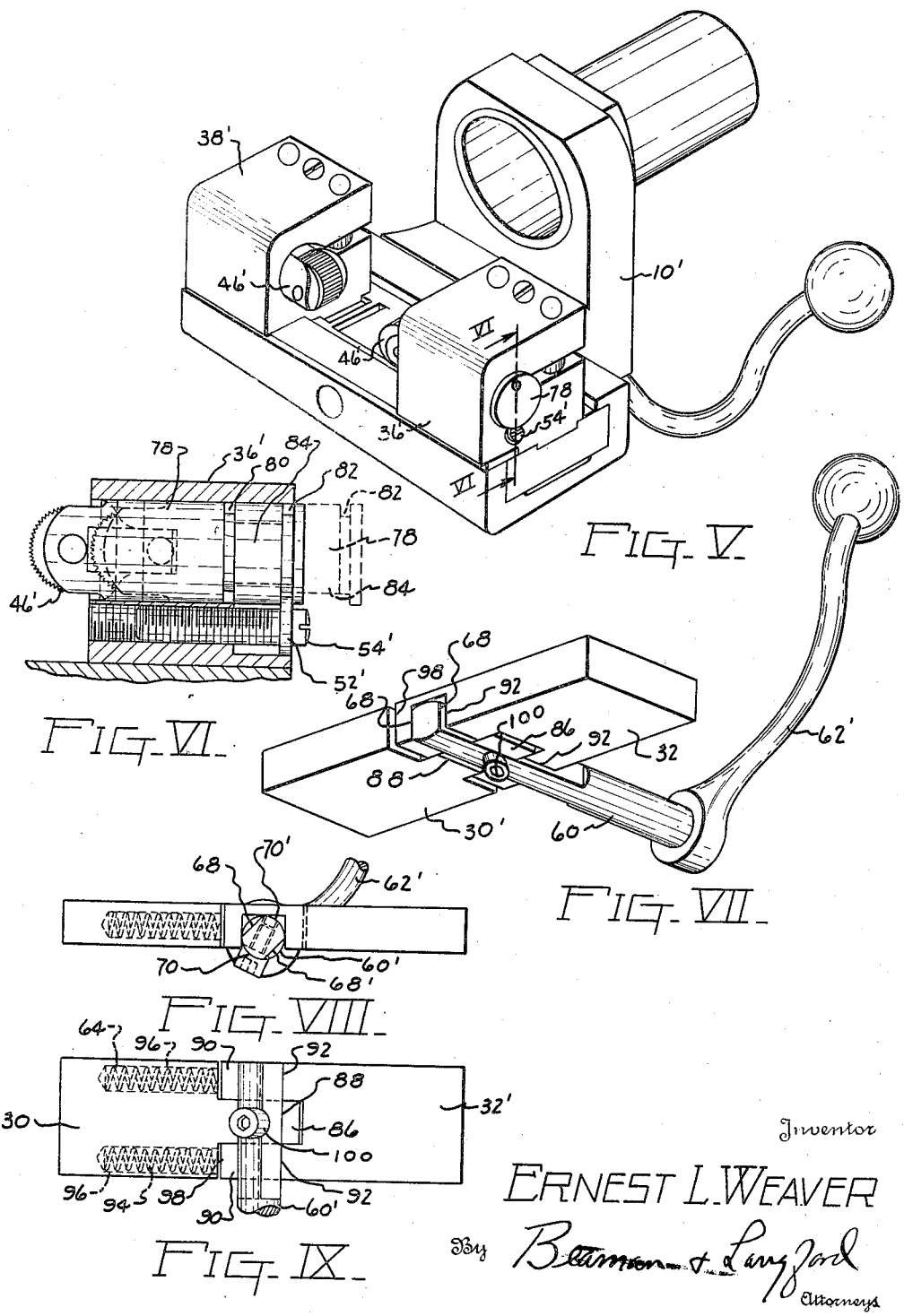
Inventor
ERNEST L. WEAVER
By Beaman + Langford
Attorneys Patented Jan. 10, 1950

2,494,073

UNITED STATES PATENT OFFICE 2,494,073

KNURLING TOOL HOLDER

Ernest L. Weaver, Jackson, Mich.

Application August 16, 1946, Serial No. 690,931

2 Claims. (Cl. 80—5.1)

The present invention relates to improvements in knurling tool holders.

It has been the general practice heretofore in performing a knurling operation upon a work piece when being rotated in a lathe or other equivalent machine tool, to mount the knurling tool holder on the cross-carriage or other suitable structure for supporting the tool for movement transversely of the axis of rotation of the work piece when the knurling of the work piece in an area inwardly of one end is desired. The knurling of the work piece in this manner is not only relatively slow, but the thrust of the knurling tool is exceedingly detrimental to the spindle bearings of the lathe.

According to the present invention, I have provided a knurling tool holder adapted to be supported in the turret or tail stock of a lathe or other machine tool, or carried by the fixed or live spindle of an automatic screw machine or similar machine tool in which case the actuation of the knurl would be automatic rather than manual.

Thus one of the objects of the present invention resides in an improved knurl holder of the type described.

Another object is to provide an improved knurl holder for knurling portions of a work piece intermediate its ends.

Another object of the invention is to provide a knurling tool holder having opposed knurls which have mechanism adapted to be brought into engagement with the work piece on opposite sides.

A still further object of the invention is to provide an improved knurl holder having a pair of cross-slides supporting the knurling tools with mechanism for imparting equal and simultaneous movement of the knurling tools toward and from the work piece from opposite sides thereof.

These and other objects and advantages considered to reside in the combination of the component parts and their specific construction and arrangement will appear from a consideration of the following specification and claims when considered in connection with the accompanying drawings, wherein Fig. I is a perspective view of the assembly with a manual actuator, Fig. II is a perspective view showing the relationship between the cross-slide and the manual actuator, Fig. III is a longitudinal cross-sectional view taken through the cross-slide, Fig. IV is a fragmentary view of the detail for adjusting the knurling tools, Fig. V is a view similar to Fig. I of a modified form of the invention, Fig. VI is a cross-sectional view taken on line VI—VI of Fig. V, illustrating the adjustments of the knurl holder, Fig. VII is a view similar of Fig. II of the modified construction, Fig. VIII is an end view of the construction shown in Fig. VII, and Fig. IX is a bottom view of the construction shown in Fig. VIII.

Referring to the illustrated embodiment of the invention, the tool holder 10 comprises a casting 12 having an upright portion 14 with a forward supporting portion 16. Mounted in the bore 18 of the upright 10 is a shank 20 having a flange 22 to receive cap screws 24 for attaching the shank 20 from the upright 14. Preferably the upright 14 and support 16 are formed as one integral casting while the shank 20 and flange 22 are formed as a separate integral casting. To permit bar stock to be passed through the shank 20, a bore 26 is provided therein.

The support 16 is provided with a longitudinally extending way 28 in which the tool carriers 32 slide and are held in position by removable ends 34.

The tool blocks 36 and 38 are secured by cap screws 40 to the carriers 30—32; the blocks 36 and 38 being provided with longitudinally extending bores 42 to receive the shanks 44 of the knurling tools 46. Longitudinal slots 48 extending into the bores 42 provide sufficient rigidity to enable the cap screws 40 when fully tightened down to tightly clamp the shanks 44 of the knurling tool 46 in the bores 42. To permit axial adjustment of the knurling tools 46 in the tool blocks 36 and 38, the shanks 44 may be provided with grooves 50 in which the collars 52 of the axially adjustable screws 54 project. By rotating the screws 54 with a suitable socket wrench, the knurling tool 46 may be axially adjusted in the tool blocks 36 and 38 relative to each other and to the work piece.

Each of the carriers 30 and 32 has an extension 56 along one side which is provided with a groove 58. A shaft 60 having an actuating handle 62 has its outer portion 66 provided with flat parallel sides 68 with the sides 70 cylindrical. As more clearly shown in Fig. III, the diameter of the portion 66 across the cylindrical sides 70 approximates the width of the grooves 58 in the carriers 30 and 32. When the shaft 60 is rotated in the positions shown in Fig. II with the flat side 68 parallel to the sides of the grooves 58, the clearance provided between the grooves 58 and the flat side 68 to permit the springs 72, housed in the carriers 30 and 32 and seating at their outer ends against the outer faces of the extensions 76, to force the carriers 30 and 32 in opposite directions bringing one side of the grooves 58 into abutting relation with one side of the flat portion 68 to move the knurls 46 out of engagement with the work piece. When the actuating handle 62 rotates the shaft 60 into the position shown in Fig. III, the carriers 30 and 32 will be drawn toward each other and the knurls 46 will engage diametrically opposed portions of the work piece with equal pressure.

It will be understood that by making the proper adjustments through the adjustment screws 54 that the knurls 46 and 48 can be accurately adjusted relative to the work piece so that they are out of contact with the work piece with the shaft 66 in the position shown in Figure II. When it is desired to knurl the work piece inwardly from one end, the knurling holder 10, mounted in the turret, for example, is advanced toward the work piece. That portion of the work piece not to be knurled passes between the knurls 46 in their retracted position and into the bore 26 if the unknurled portion is sufficiently long. Thereafter, the operator swings the handle 62 to partially rotate the shaft 60, bringing the portion 66 into the position shown in Fig. III to bring the knurling tools 46 into engagement with the work and exerting equal pressure upon opposite sides thereof to relieve the spindle of the lathe from the side thrusts experienced with conventional forms of knurling tools carried on the cross slide. When the knurling operation has been completed the operator throws the actuating handle 62 in the opposite direction to retract the knurling tools 46 and the holder 10 is retracted to clear the work piece.

In lieu of the manually-actuated handle 62, when the holder 10 is being used in automatic lathes, a suitable cam actuated lever will be substituted for the handle 62 to permit the shaft 60 to be automatically actuated in accordance with the cycle of operation of the machine tool.

Knurling tool holders embodying some of the principles of construction and operation of my invention have heretofore been proposed. Reference may be had to the Babson Patent No. 1,116,005 and the Nelson Patent No. 2,294,685. The present invention is considered an improvement thereover.

In the modified form of the invention shown in Figs. V to IX, inclusive, the tool holder 10' may be substantially identical with that shown in Fig. I except for the details of construction illustrated in Figs. VI to IX, inclusive.

Referring to Fig. VI, the adjustment of the knurling tool 46' in the block 36' has been modified over that shown in Fig. IV by providing the shank 78 with axially spaced grooves 80 and 82 in which the flange 52' of the adjustment screw 54' may be selectively engaged. This has been accomplished, in the illustrated form, by milling a flat 84 on the shank 78. By rotating the shank 78 in the block 36' to bring the flat 84 directly above the flange 52', the knurling tool 46' may be moved into the dotted line position as shown in Fig. VI to bring the flange 52' into the groove 80. The shank 78 is then rotated to carry the flat 84 out of register with the flange 52'. With the flange 52' in the groove 80, the maximum size bar stock or work piece may be received between the knurling tools 46' with micrometer adjustment being provided through the adjustment screw 54'.

In the adjustment arrangements shown in Fig. IV, the extreme inner and outer positions of the tool holder 46 are entirely controlled by the adjustments of the screw 54. In the modification shown in Fig. VI, the grooves 80 and 82 provide the extreme inner and outer positions of adjustment with the screw 54' providing micrometer adjustments of the knurling tool 46' with the knurling tool 46' in either position of adjustment.

In lieu of the carrier arrangement shown in Figs. II and III, a more balanced construction and arrangement is illustrated in Figs. VII to IX, inclusive, in which carriers 30' and 32' are actuated by the rocking of the shaft 60' through the handle 62' to move the blocks 36' and 38' towards and from each other in a manner similar to that described with reference to the form of the invention shown in Figs. I to IV, inclusive.

In lieu of the unbalanced arrangement as shown in Figs. I to IV, inclusive, the carrier 30' is provided with a centrally located tongue portion 86 having a cross groove 88, while the carrier 32' supports members 90 having aligned cross grooves 92. Compression springs 94 housed in the pocket 96 defined in the carrier 30' act against ends 98 of the carrier 32' to force the carriers 30' and 32' apart.

As in the modification described in Figs. I to IV, the shank 65 has flat parallel sides 68' separated by cylindrical sides 70'. Rotation of the shank 60' acts to urge the carriers 30' and 32' towards each other in the same manner as described with reference to the form shown in Figs. I to IV. To conveniently limit the arc through which the shank 60' may be rocked by the handle 62', a cap screw 100 is shown threaded into the shank 60' with the head engaging with opposite sides of the cross slot 88 upon rocking movement of the shank 60' in opposite directions.

Having thus described my invention, what I claim as new and desire to cover by Letters Patent is:

1. A knurling tool holder comprising a mounting shank, a support, a transverse way defined in said support, tool carriages slidably supported in said way and adapted to move toward and from each other, said carriages having overlapping extensions upon the opposed ends thereof, slots formed in said extensions, a rock shaft extending transversely from said support and being disposed in the grooves of said extensions, said rock shaft having eccentric portions engaging with the sides of said grooves to move said carriages relative to each other upon rocking said rock shaft, and knurling tools supported in said carriages.

2. A knurling tool holder comprising a mounting shank, an upright portion on which said mounting shank is attached, a support forward and below said upright portion, a transverse way defined in said mounting portion, a pair of carriages supported and guided in said way, tool blocks mounted upon said carriages, knurling tools supported in said tool blocks and longitudinally adjustable therein, said carriages having overlapping extensions provided at their opposed ends, springs housed in said carriages and projecting beyond the opposed ends thereof to engage the extension of the opposite carriage to force said carriages apart and to retract the knurling tools from the work piece, transverse grooves defined in said extensions and in axial alignment, a rock shaft extending transversely of said support and being disposed in said aligned grooves, and eccentric portions upon opposite sides of said rock shaft engaging with corresponding sides of said grooves to move said carriages toward each other with similar and positive action to bring the knurling tools into engagement with the diametrically opposed portions of the work piece.

ERNEST L. WEAVER.

REFERENCES CITED

The following references are of record in the file of this patent:

UNITED STATES PATENTS

| Number | Name | Date |
|---|---|---|
| 656,952 | Dornheim | Aug. 29, 1900 |